Oct. 19, 1937.  J. E. DUBE ET AL  2,096,094
TEMPERATURE REGULATOR
Filed July 2, 1935
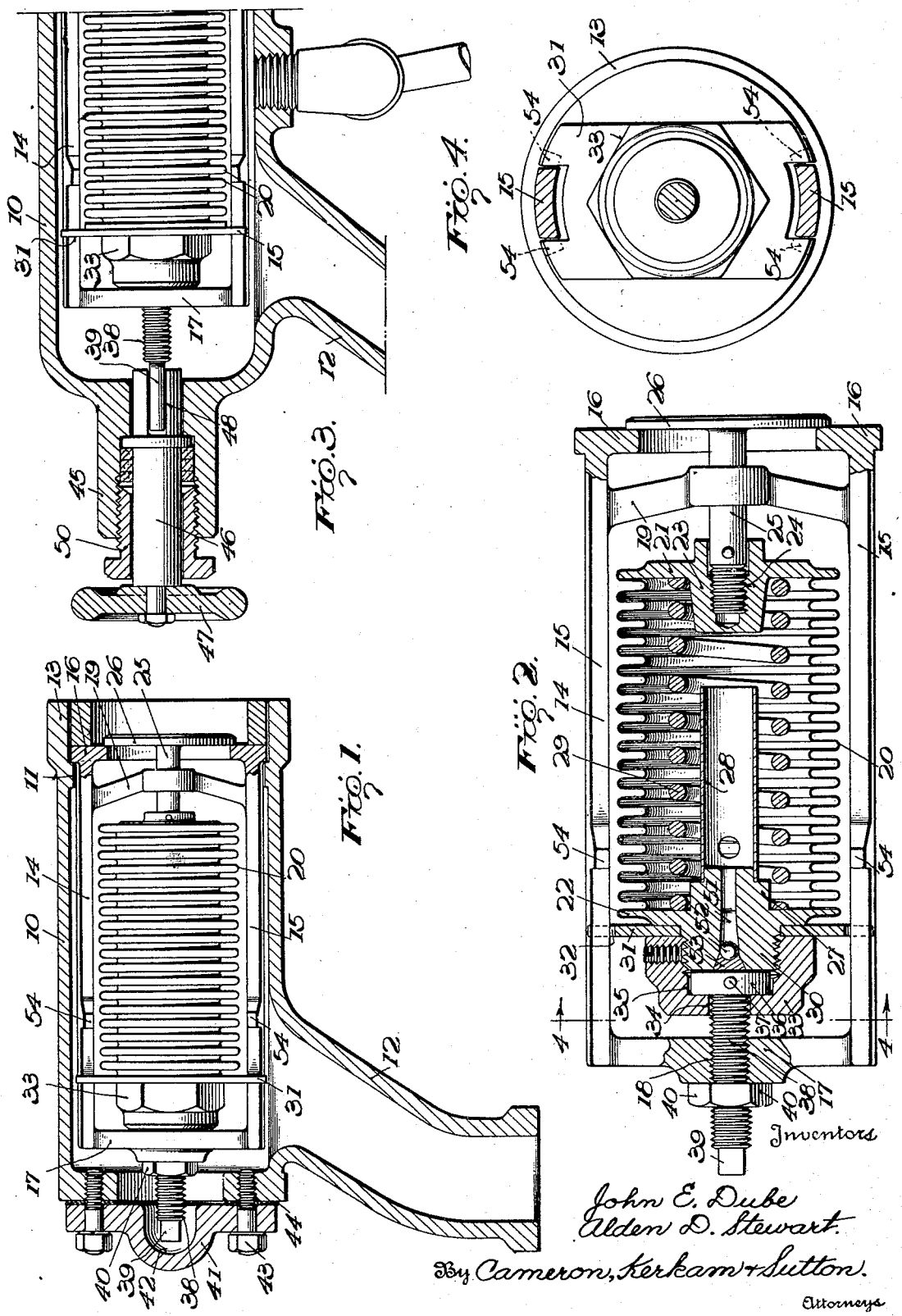
Inventors
John E. Dube
Alden D. Stewart.
By Cameron, Kerkam & Sutton.
Attorneys Patented Oct. 19, 1937

2,096,094

UNITED STATES PATENT OFFICE 2,096,094

TEMPERATURE REGULATOR

John E. Dube and Alden D. Stewart, Knoxville, Tenn., assignors to The Fulton Sylphon Company, Knoxville, Tenn., a corporation of Delaware Application July 2, 1935, Serial No. 29,566

10 Claims. (Cl. 236—34)

This invention relates to temperature regulators, and more particularly to temperature regulators for controlling the flow of cooling medium through the cooling systems of internal combustion engines.

It is an object of this invention to provide a device of the type characterized which is suitable for installation within a cooling system and which may be adjusted to predetermine the temperature at which the valve for controlling the flow of cooling medium will open.

Another object of this invention is to provide a device of the type characterized which includes a corrugated expansible and collapsible wall and wherein the mechanism for predetermining the temperature at which the valve will open imposes no torsional stress upon said expansible and collapsible wall.

Another object of this invention is to provide a device of the type characterized which includes a thermostat of the type employing a deeply corrugated expansible and collapsible lateral wall of relatively thin metal and which embraces mechanism for expanding and contracting said thermostat to predetermine the temperature at which the thermostat will open the valve but without rotating said thermostat or imposing a torsional stress on said corrugated wall.

Another object of this invention is to provide a device of the type characterized with threaded means for expanding and collapsing the thermostat to predetermine the temperature at which the thermostat will open the valve and which has a swivel connection with said thermostat so that relative movement therebetween is permitted both as respects alignment and as respects relative rotation.

Another object of this invention is to provide a device of the type characterized with means which is readily accessible from the exterior of the regulator for adjusting the temperature at which the thermostat will open the valve and which means may be provided with a hand wheel for operating the same or said means may be enclosed in the cooling system so as to prevent unauthorized tampering therewith, as preferred.

Another object of this invention is to provide a device of the type characterized which is simple in construction, composed of parts that may be fabricated and assembled at low cost, and which is durable in character and highly efficient in operation.

Other objects will appear as the description of the invention proceeds.

The invention is capable of receiving a variety of mechanical expressions, two of which are illustrated on the accompanying drawing, but it is to be expressly understood that the drawing is for purposes of illustration only and is not to be construed as a definition of the limits of the invention, reference being had to the appended claims for that purpose.

Referring in detail to the drawing, wherein the same reference characters are employed to designate corresponding parts in the several figures, Fig. 1 is an axial section of an embodiment of the present invention installed as a choker type regulator in a cooling system;

Fig. 2 is an axial section on an enlarged scale of the regulator of Fig. 1 removed from the cooling system;

Fig. 3 is an axial section corresponding to Fig. 1 but showing another embodiment of the means for adjusting the thermostat; and Fig. 4 is a section on the line 4—4 of Fig. 2.

In the form shown in Figs. 1, 2 and 4, 10 designates a casing forming part of the cooling system of an internal combustion engine, and here shown as generally cylindrical in form and provided interiorly with an inwardly projecting rib 11 to provide a shoulder against which the regulator to be described may be retained in any suitable way. Communicating with the casing 10, and here shown as formed integrally therewith, is a tube 12 which may be connected in any suitable way with a conduit of the cooling system, as a conduit extending from the engine jacket, the open end of the casing 13 being designed to communicate with a second portion of the cooling system, as a radiator.

Mounted within the casing 10 is the regulator of the present invention and shown on an enlarged scale in axial section in Fig. 2. As here illustrated said regulator comprises a frame 14 of any suitable size, construction and material, here shown as comprising a pair of axially extending leg members 15 suitably attached to or formed integral with an annular valve seat member 16 which projects radially beyond the legs 15 so as to provide a shoulder which may seat against the shoulder of the rib 11 heretofore referred to. At the opposite end said legs 15 are suitably attached to or formed integrally with a spider 17 provided with a central threaded aperture 18. Also attached to or formed integral with said leg members, adjacent the valve seat member 16, is a second spider 19 centrally apertured to provide a valve stem guide.

Mounted within said frame 14 is a thermostat composed of a deeply corrugated expansible and collapsible tubular metal wall 20 suitably attached, as by soldering or brazing, to end walls 21 and 22. End wall 21 is provided with a reentrant hub portion 23 to which is secured in any suitable way, as by the threaded connection 24, a valve stem 25 which passes through the valve stem guide 19 and has suitably attached to or formed integrally therewith a valve disk 26 adapted to seat on the valve seat member 16. The opposite end wall 22 is also provided with an interiorly projecting hub member 27 to which may be suitably secured a tubular stop 28 that is adapted to engage the inner face of the hub 23 and prevent collapse of the corrugated lateral wall beyond a predetermined amount. Interposed between the end walls 21 and 22, and centered by the inwardly projecting hubs 23 and 27 is a coil spring 29 which normally tends to expand said corrugated wall 20, although said spring may be omitted if the resilience of the lateral wall 20 is such as to provide for the desired action as hereinafter explained.

End wall 22 is also provided with an externally projecting threaded hub 30 on which is mounted a plate 31 having at its periphery means cooperating with the legs 15 to prevent rotation of said plate but permitting said plate to move axially of said thermostat. As shown the periphery of said plate is provided with slots 32, disposed as to number and arrangement in conformity with the number and arrangement of the legs 15, said slots 32 being adapted to receive said legs 15 and have sliding contact therewith. Plate 31 is secured on said hub 30 by a cap nut 33 threaded onto said hub. Said cap nut is provided in its end wall with a central aperture 34 and said end wall is spaced from the end of the hub 30 so as to provide a cavity 35 therein. Located within and substantially filling said cavity is an annular member 36 to which is pivoted at 37 a screw 38 having threaded engagement in the aperture 18 of the frame. Annular member 36 with its pivoted connection to the screw 38 provides a swivel joint whereby upon rotation of the screw 38 the end wall 22 of the thermostat may be moved in one direction or the other, depending upon the direction of rotation of the screw, but without the rotation of the screw imparting rotation to the thermostat owing to the cooperation of plate 31 with the frame. The pivotal connection 37 provides for any lack of alignment which may exist between the screw 38 and the axis of the thermostat and permits rotation of the screw without binding of the parts. As annular member 36 rotates with the screw 38 within the cavity 35 the frictional contact between said annular member 36 and the cap nut 34 or hub 30 would tend to impart a torsional stress to the corrugated wall 20, but the plate 31, owing to its cooperation with the legs 15 where they pass through the slots 32, also positively prevents rotation of the end wall 22 and therefore prevents the transmission of rotary torque through said end wall to the corrugated wall 20.

The outwardly projecting end of the screw 38 may be squared or otherwise suitably shaped as shown at 39 so that it may be engaged by a wrench or other suitable tool for effecting the desired adjustment. To lock the screw in position after adjustment a lock nut 40 is shown thereon in engagement with the end face of member 17. In the embodiment of Fig. 1 the casing 10 is provided with a removable cover 41 recessed at its central portion as shown at 42 to receive the outwardly projecting end of the screw 38 and attached to the casing 10 in any suitable way as by a plurality of machine screws 43. A gasket 44 is preferably disposed between said cover 41 and the body of the casing 10 to prevent leakage between said body and cover. In this embodiment the adjusting mechanism is enclosed against unauthorized tampering when the cover 41 is secured to the casing 10 and the entire regulator is immersed in the cooling medium which fills the cooling system. If preferred, however, the adjusting mechanism may be extended to the exterior of the casing 10 and provided with a suitable operating member so that the adjusting mechanism is always accessible for operation from the exterior of the cooling system. In the embodiment of Fig. 3 the casing 10 is shown as provided with a tubular extension 45 in which is rotatably mounted a stem 46 having any suitable hand wheel or other operating element 47 secured to the end thereof. At its inner end said stem 46 has a non-circular recess 48 conforming in shape to the shape of the adjusting screw 38. Any suitable stuffing box 50 may be disposed about the stem 46 to prevent leakage around said stem.

The thermostat provided by the corrugated wall 20 and end walls 21, 22 may be charged with any suitable thermosensitive medium, a filling opening 51 being shown as extending through the hubs 30 and 27. After the charge has been introduced into the thermostat said filling opening may be sealed in any suitable way as by a ball 52 and plug of solder 53. Said thermostat may be charged with its thermosensitive medium at a pressure which is below atmospheric pressure at all temperatures below that at which the valve is designed to open so that the differential between the external and internal pressures, acting against the resilience of the corrugated wall 20 and the contained coil spring 29, tends to hold the valve disk 26 upon its seat 16. When the temperature of the medium in which the thermostat is immersed rises to that at which the valve is designed to open, however, the thermosensitive medium within said thermostat expands said thermostat to lift the valve 26 off of its seat 16.

The temperature at which the valve starts to open may be predetermined by adjustment of the combined resilient action of the corrugated wall 20 and the spring 29 by adjusting the length of the thermostat through rotation of the screw 38. Rotation of said screw in one direction or the other causes the end wall 22, to which the screw is attached through the swivel connection 36, 37 and cap nut 33, to move in one direction or the other so as to expand or contract the corrugated tubular wall 20 and vary the tension thereof and of the spring 29. During this adjustment end wall 22 is prevented from rotating by the coaction of the plate 31 with the legs of the frame 15, but said plate 31 may slide lengthwise of the said legs within the limits permitted by the engagement of the cap nut 35 with the end member 17 of the frame, in one direction, and the engagement of the disk 32 with stops suitably provided on said legs 15, in the other direction, said stops being here shown as lugs 54 projecting circumferentially of the disk at each side of each leg, although if preferred any other suitable stop may be provided. Within the limits thus provided the tension of the spring 29 and the corrugated wall 20 may be varied to determine the pressure within the thermostat which must exist in order to lift the valve member 26 off of its seat 16, and thus the temperature at which the valve opens may be varied as desired over a considerable range of temperature.

It will therefore be perceived that by the present invention a temperature regulator suitable for use in controlling the circulation of cooling medium through the cooling system of an internal combustion engine has been provided wherein the regulator is normally immersed in the cooling medium but includes mechanism projecting to the exterior of said regulator whereby said regulator may be readily adjusted to predetermine the temperature at which the valve will open. Said adjusting mechanism is so constructed and associated with said regulator that the adjustment is effected without rotation of the regulator and without the imposition of a torsional stress on the deeply corrugated tubular wall of the thermostat. Not only does it provide for adjustment of the thermostat without imposing torsional stress thereon, but the adjusting mechanism is so associated with the thermostat that the thermostat may be out of alignment with the adjusting mechanism without interfering with proper adjustment because of the swivel connection provided between the thermostat and the adjusting mechanism. Moreover, said adjusting mechanism may be readily associated with the cooling system so that it cannot be tampered with under normal conditions, or if preferred, said adjusting mechanism may be extended to the exterior of the cooling system where it is readily accessible for manipulation. The regulator of the present invention is simple in construction, composed of parts that may be readily standardized and manufactured at relatively low cost and easily assembled. The structure is strong and durable and highly efficient in operation.

While the embodiment of the invention illustrated on the drawing has been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement, proportion, etc., of parts, and certain features may be used without other features, without departing from the spirit of this invention. Thus the plate 31 may be omitted (see Fig. 3) if the latter wall 20 is strong enough so that the torsional strain of the adjusting mechanism thereon is unlikely to injure said lateral wall, in which event reliance may be placed on the manner in which the regulator is mounted to prevent rotation of the thermostat. While the invention has particular utility in providing an adjustable regulator for use in a cooling system, it is of wider application as it provides a simple and readily adjustable regulator that may be used in a wide variety of relationships. Therefore reference is to be had to the appended claims for a definition of the invention.

What is claimed is:

1. In a temperature regulator for controlling the flow of cooling medium through the cooling system of an internal combustion engine, the combination of a frame provided with a valve seat and adapted to be immersed in the cooling medium of said system, a valve member cooperating with said seat, a thermostat comprising an expansible and collapsible lateral wall and end walls connected thereto, one of said end walls being operatively connected to said valve member, and means for adjusting said thermostat including a threaded member mounted in said frame and operatively connected to the other of said end walls to positively expand or contract said thermostat.

2. In a temperature regulator for controlling the flow of cooling medium through the cooling system of an internal combustion engine, the combination of a frame provided with a valve seat, a valve member cooperating with said seat, a thermostat comprising an expansible and collapsible lateral wall and end walls connected thereto, one of said end walls being operatively connected to said valve member, and means to adjust said thermostat including a rotatable member having threaded engagement in an aperture in said frame and a swivel connection with the other of said end walls whereby rotation of said threaded member will expand or contract said thermostat.

3. In a temperature regulator, the combination of a frame provided with a valve seat, a valve member cooperating with said seat, a thermostat including an expansible and collapsible lateral wall and end walls connected thereto, one of said end walls being operatively connected to said valve member, means secured to the other of said end walls and cooperating with said frame to permit axial movement of said end wall but prevent rotary movement thereof, and means for adjusting said thermostat including a rotatable member positively connected with said last named end wall and having threaded engagement with an aperture in said frame.

4. In a temperature regulator, the combination of a frame provided with a valve seat, a valve member cooperating with said seat, a thermostat including an expansible and collapsible lateral wall and end walls connected thereto, one of said end walls being operatively connected to said valve member, a plate secured to the other of said end walls and provided with peripheral slots having sliding engagement with said frame but preventing rotation of said last named end wall, and means for adjusting said thermostat including a rotatable member having a swivel connection with said last named end wall and threaded engagement with an aperture in said frame.

5. In a temperature regulator, the combination of a frame provided with a valve seat, a valve member cooperating with said seat, a thermostat including an expansible and collapsible lateral wall and end walls connected thereto, one of said end walls being operatively connected to said valve member, and means for expanding or contracting said thermostat without imposing a torsional stress on said lateral wall including a rotatable member having threaded engagement in an aperture of said frame, a thrust member having pivotal connection with the end of said threaded member, a member attached to the other of said end walls and cooperating with said thrust member to provide relative rotation therebetween but transmitting the axial movement of said thrust member to said last named end wall, and means associated with said last named end wall and cooperating with said frame to prevent rotation of said end wall.

6. In a temperature regulator for controlling the flow of cooling medium through the cooling system of an internal combustion engine, the combination of a frame provided with a valve seat, a valve member cooperating with said seat, a thermostat including an expansible and collapsible lateral wall and end walls connected thereto, one of said end walls being operatively connected to said valve member, and means for expanding or contracting said thermostat including a threaded member rotatably mounted in said frame and means pivotally connecting said threaded member to the other of said end walls whereby said threaded member may adjust the said thermostat although said threaded member and thermostat are out of alignment.

7. In a temperature regulator for controlling the flow of cooling medium through the cooling system of an internal combustion engine, the combination of a frame provided with a valve seat, a valve member cooperating with said seat, a thermostat including an expansible and collapsible lateral wall and end walls connected thereto, one of said end walls being operatively connected to said valve member, and means for expanding or contracting said thermostat including a threaded member rotatably mounted in said frame, a thrust member connected to said threaded member, and means operatively connecting said thrust member to the other of said end walls whereby axial movement of said threaded member in either direction is transmitted to said last named end wall.

8. In a temperature regulator for controlling the flow of cooling medium through the cooling system of an internal combustion engine, the combination of a frame provided with a valve seat, a valve member cooperating with said seat, a thermostat including an expansible and collapsible lateral wall and end walls connected thereto, a coil spring within said thermostat and reacting between said end walls, one of said end walls being operatively connected to said valve member, means for preventing rotation of said thermostat, and means for adjusting the tension of said spring from the exterior of said thermostat including a threaded member rotatably mounted in said frame and having a positive but relatively rotatable connection with the other of said end walls.

9. In a temperature regulator for controlling the flow of cooling medium through the cooling system of an internal combustion engine, the combination of a frame provided with a valve seat, a valve member cooperating with said seat, a thermostat including an expansible and collapsible lateral wall and end walls connected thereto, a coil spring within said thermostat and reacting between said end walls, one of said end walls being operatively connected to said valve member, means for preventing rotation of said thermostat, and means for adjusting the tension of said spring from the exterior of said thermostat including a threaded member rotatably mounted in said frame, a thrust member pivotally mounted on the end of said frame, and means operatively connecting said thrust member to the other of said end walls and providing relative rotation therebetween whereby axial movement of said threaded member in either direction is transmitted to said last named end wall.

10. In a temperature regulator for controlling the flow of cooling medium through the cooling system of an internal combustion engine, the combination of a frame provided with a valve seat, a valve member cooperating with said seat, a thermostat including an expansible and collapsible lateral wall and end walls connected thereto, a coil spring within said thermostat and reacting between said end walls, one of said end walls being operatively connected to said valve member, means for preventing rotation of said thermostat, and means for adjusting the tension of said spring from the exterior of said thermostat including a threaded member rotatably mounted in said frame, and means providing a swivel connection between said threaded member and the other of said end walls whereby axial movement of said threaded member is transmitted to said last named end wall without rotating the same.

JOHN E. DUBE.
ALDEN D. STEWART.